(12) United States Patent
Idicula et al.

(10) Patent No.: US 9,471,801 B2
(45) Date of Patent: Oct. 18, 2016

(54) METHOD AND APPARATUS TO SUPPORT PRIVILEGES AT MULTIPLE LEVELS OF AUTHENTICATION USING A CONSTRAINING ACL

(75) Inventors: Sam Idicula, San Jose, CA (US); Thomas Keefe, Mill Valley, CA (US); Mohammed Irfan Rafiq, Mountain View, CA (US); Tanvir Ahmed, Hayward, CA (US); Vikram Pesati, San Jose, CA (US); Nipun Agarwal, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1140 days.

(21) Appl. No.: 11/947,235

(22) Filed: Nov. 29, 2007

(65) Prior Publication Data

US 2009/0144804 A1     Jun. 4, 2009

(51) Int. Cl.
*G06F 21/62* (2013.01)

(52) U.S. Cl.
CPC ... *G06F 21/6218* (2013.01); *G06F 2221/2141* (2013.01)

(58) Field of Classification Search
CPC .................. G06F 21/6218; G06F 2221/2141
See application file for complete search history.

(56) References Cited

U.S. PATENT DOCUMENTS

| | | | |
|---|---|---|---|
| 5,911,143 A * | 6/1999 | Deinhart et al. | |
| 6,023,765 A * | 2/2000 | Kuhn | 726/4 |
| 6,609,198 B1 * | 8/2003 | Wood et al. | 713/155 |
| 7,086,085 B1 * | 8/2006 | Brown | G06F 21/6218 714/E11.207 |
| 2002/0169874 A1 * | 11/2002 | Batson | H04L 63/08 709/225 |
| 2002/0169986 A1 * | 11/2002 | Lortz | 713/201 |
| 2003/0084289 A1 * | 5/2003 | Watanabe | G06F 21/32 713/168 |
| 2004/0044905 A1 * | 3/2004 | Heath et al. | 713/200 |
| 2004/0205355 A1 * | 10/2004 | Boozer et al. | 713/200 |
| 2004/0210771 A1 * | 10/2004 | Wood et al. | 713/201 |
| 2004/0243822 A1 * | 12/2004 | Buchholz et al. | 713/200 |
| 2005/0172151 A1 * | 8/2005 | Kodimer et al. | 713/201 |
| 2006/0053296 A1 * | 3/2006 | Busboom | H04L 63/083 713/182 |
| 2006/0224590 A1 * | 10/2006 | Boozer et al. | 707/9 |
| 2007/0005595 A1 * | 1/2007 | Gafter | 707/6 |
| 2007/0100830 A1 * | 5/2007 | Beedubail et al. | 707/9 |
| 2007/0214497 A1 * | 9/2007 | Montgomery et al. | 726/4 |
| 2008/0005115 A1 * | 1/2008 | Corley et al. | 707/9 |
| 2008/0028453 A1 * | 1/2008 | Nguyen et al. | 726/9 |
| 2009/0007249 A1 * | 1/2009 | Lu et al. | 726/9 |
| 2009/0106823 A1 * | 4/2009 | Durski | 726/4 |

OTHER PUBLICATIONS

Vuong, Nathan N. et al. "Managing Security Policies in a Distributed Environment Using eXtensible Markup Language (XML)," 2001, ACM.*

* cited by examiner

*Primary Examiner* — Darren B Schwartz
(74) *Attorney, Agent, or Firm* — Shun Yao; Park, Vaughan, Fleming & Dowler LLP

(57) ABSTRACT

Embodiments of the present invention provide systems and techniques for creating, updating, and using an ACL (access control list). A database system may include a constraining ACL which represents a global security policy that is to be applied to all applications that interact with the database. By ensuring that all ACLs inherit from the constraining ACL, the database system can ensure that the global security policy is applied to all applications that interact with the database. During operation, the system may receive a request to create or update an ACL. Before creating or updating the ACL, the system may modify the ACL to ensure that it inherits from the constraining ACL. In an embodiment, the system grants a privilege to a user only if both the ACL and the constraining ACL grant the privilege.

18 Claims, 6 Drawing Sheets

METHOD AND APPARATUS TO SUPPORT PRIVILEGES AT MULTIPLE LEVELS OF AUTHENTICATION USING A CONSTRAINING ACL

BACKGROUND

1. Field of the Invention

The present invention relates to database security. More specifically, the present invention relates to a method and apparatus to support privileges at multiple levels of authentication using a constraining ACL (access control list).

2. Related Art

As computer systems store ever-larger amounts of sensitive data, it is becoming increasingly important to protect this sensitive data from unauthorized accesses. The global costs incurred from such database security breaches can run into billions of dollars annually, and the cost to individual companies can be severe, sometimes catastrophic.

Systems typically determine privileges based on a user's login name or a user's role. There is a growing need to determine privileges based on multiple levels of authentication, both in private enterprises and government institutions, especially when dealing with highly sensitive data. Note that it is generally desirable to use security architectures that are flexible, maintainable, and auditable.

SUMMARY

One embodiment of the present invention provides a system that creates an ACL (access control list) in a database which includes a constraining ACL which specifies privileges based on a user's authentication level. The constraining ACL can represent a global security policy that is to be applied to all applications that interact with the database. During operation, the system may receive an ACL description which specifies a user's privileges. The ACL description can be encoded in XML (extensible markup language). Next, if the ACL description does not specify that the ACL inherits from the constraining ACL, the system may modify the ACL description so that the modified ACL description specifies that the ACL inherits from the constraining ACL. The system may then create the ACL using the modified ACL description, thereby ensuring that the database uses both the ACL and the constraining ACL to determine privileges. In this manner, the database can ensure that the global security policy is applied to all applications that interact with the database.

Another embodiment of the present invention provides a system that updates an ACL in a database. During operation, the system may receive an update for an ACL. Next, if the update does not specify that the ACL inherits from the constraining ACL, the system may modify the update so that the modified update specifies that the ACL inherits from the constraining ACL. The system can then update the ACL using the modified update, thereby ensuring that the database uses both the ACL and the constraining ACL to determine privileges.

Yet another embodiment of the present invention provides a system that uses an ACL to determine user privileges in a database. During operation, the system can authenticate a user at an authentication level, wherein the authentication level is associated with a role. Next, the system can associate the role with the user, thereby enabling the database to use the role to determine the user's privileges based on the authentication level. The system can then receive a request from the user to perform an operation on a piece of data. Next, the system can identify an ACL associated with the data, wherein the ACL specifies the user's privileges, and wherein the ACL inherits from a constraining ACL which specifies the role's privileges. The system can then use the ACL to determine whether the user is permitted to perform the operation. Next, the system can use the constraining ACL to determine whether the role is permitted to perform the operation. The system can then perform the operation on the data in response to determining that both the user and the role are permitted to perform the operation.

In a variation on this embodiment, all ACLs except for the constraining ACL can inherit from the constraining ACL.

In a variation on this embodiment, the system can report an error if the user is not permitted to perform the operation on the data. Similarly, the system can report an error if the role is not permitted to perform the operation on the data.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Database System

Figure 1:
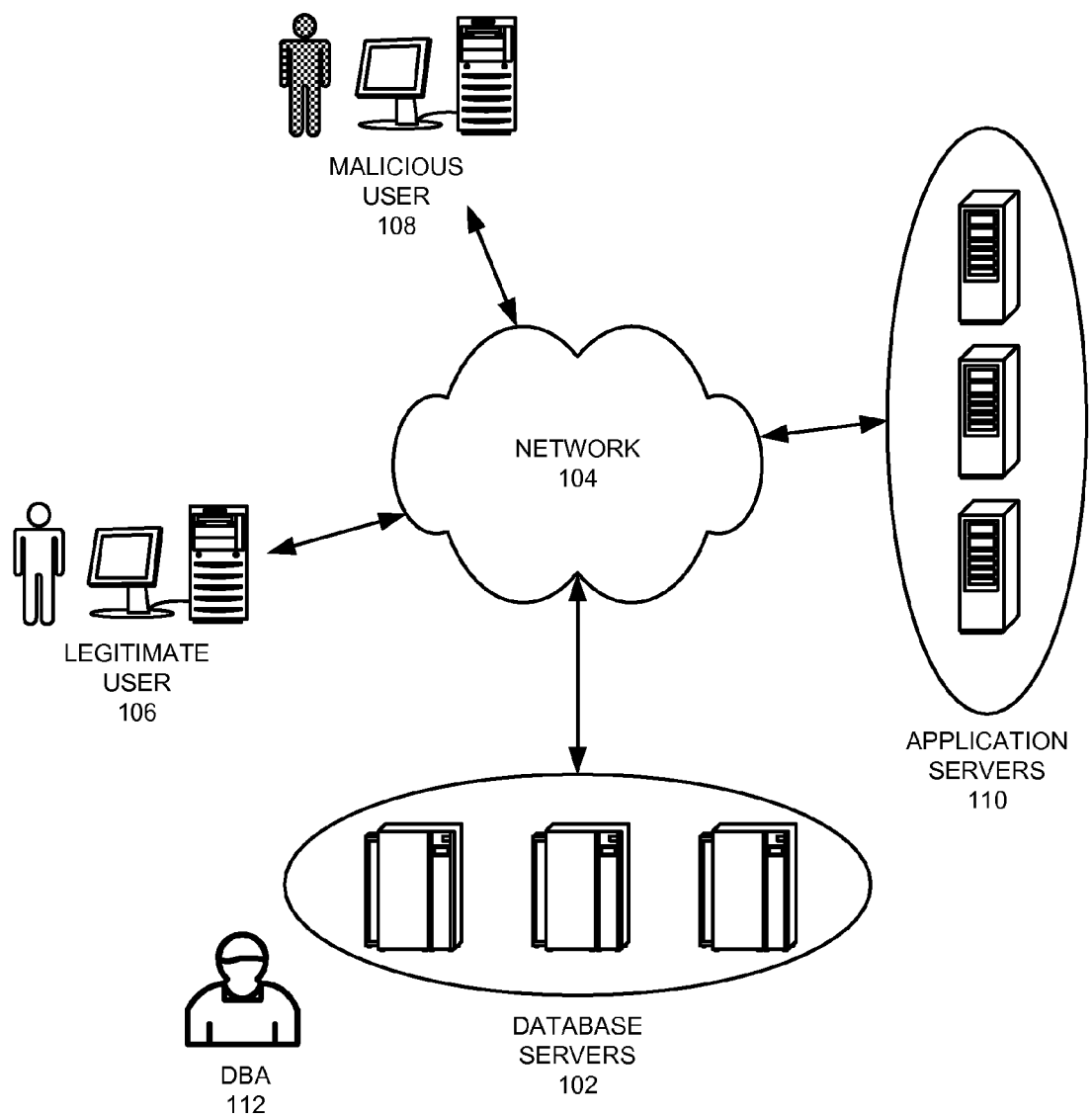
FIG. 1 illustrates a database system in accordance with an embodiment of the present invention.

FIG. 1 illustrates a database system in accordance with an embodiment of the present invention. Database system includes a set of application servers 110, a set of database servers 102, and a database administrator (DBA) 112. The figure shows two users (or clients), namely, legitimate user 106 and malicious user 108. Users 106 and 108, application servers 110, and database servers 102 can communicate with one another via network 104.

Networks 104 can generally include any type of wire or wireless communication channel capable of coupling together computing nodes. This includes, but is not limited to, a local area network, a wide area network, or a combination of networks. In one embodiment of the present invention, network 104 can include the Internet. Network 104 can also be a private network. Note that in some configurations application servers 110 and database servers 102 can be located on the same physical device.

Database servers 102 can store data using a variety of data storage systems. This includes, but is not limited to, systems based upon magnetic, optical, and magneto-optical storage devices, as well as storage devices based on flash memory and/or battery-backed up memory.

Database administrator (DBA) 112 is responsible for the operation and maintenance of database servers 102, and typically has the privilege to modify data stored in the storage system.

In a typical scenario, database clients allow a user, such as legitimate user 106, to enter data through a user interface, such as a web browser. This data can be sent to one of the application servers 110 across network 104. The application server may form a database query using the data supplied by client 106 and forward this query to the database servers 102 across network 108. Database servers 102 can validate the query and, if valid, perform the requested operation.

It is becoming increasingly important to protect sensitive data from unauthorized accesses. For example, a database system may want to allow legitimate users, such as user 106, to access the system, but prevent malicious users, such as users 108, from accessing or modifying data. One of the major challenges in providing database security is to continually monitor database use by persons attempting to access or modify data beyond their authority.

Supporting Privileges Based on a User's Authentication Level

Systems typically grant privileges based on a user's login name or a user's role. For example, a system may grant access to a company's financial data to the company's CFO (chief financial officer), but may deny access to this data to an engineer. Before performing operations on a database application, users typically authenticate using an authentication mechanism. For example, a user may authenticate using an expired cookie, a password, or a fingerprint scan.

Since conventional approaches usually do not use a user's level of authentication to determine user privileges, it can create security vulnerabilities because some authentication mechanisms are more secure than others. The level of security of an authentication mechanism can depend on how easy it is for a malicious user to misuse or circumvent the authentication mechanism. At one end of the spectrum, an expired cookie may represent a weak authentication mechanism, while at the other end of the spectrum, a fingerprint or retinal scan may represent a strong authentication mechanism.

There is a growing need to determine privileges based on multiple levels of authentication, both in private enterprises and government institutions, especially when dealing with highly sensitive data. Specifically, administrators may want to provide access to sensitive data only if the user authenticates using a strong authenticating mechanism. Unfortunately, as noted earlier, conventional techniques typically grant or deny privileges based on a user's profile without taking into account how the user was authenticated. Further, conventional approaches do not provide a way to account for the user's authentication level in a flexible manner that is easily maintainable and auditable.

An embodiment of the present invention provides a flexible, declarative solution to express system-wide policies for different levels of authentication. Specifically, an embodiment enables an administrator to specify an authentication security policy in a language that can be used to represent structured data, e.g., XML. The security policy can then be used to determine privileges based on the user's authentication level.

Access Control Lists

An ACL is a list of access control entries (ACEs); each ACE specifies that a privilege or a set of privileges be granted or denied to a certain principal (user or role). An ACE typically specifies whether it is granting or denying privileges, the principal, and the specific privileges that are being granted or denied. The principal can be a regular role or a dynamic role. A regular role is usually associated with a user name. A dynamic role is not necessarily associated with a particular user, and can be applied dynamically to a user during operation.

An ACL can be associated with a security class which is a set of privileges. When an ACL is associated with a security class, the privileges specified in the security class are the only privileges that the ACL can grant or deny. The system may also include a special type of privilege which encompasses all privileges. If an ACE grants or denies this special type of privilege, it means that the ACE is granting or denying all the privileges that are specified in the security class.

Inheritance can be defined between ACLs, e.g., a child ACL can inherit from a parent ACL. Note that the DAV (Distributed Authoring and Versioning) ACL schema does not allow inheritance between ACLs. Security classes can also support inheritance, e.g., a child security class can inherit from a parent security class. If an ACL is associated with a security class, it can grant or deny those privileges that are defined in the associated security class or those that are defined in any of its ancestor security classes. The system may include a special security class that contains all privileges.

ACLs can be associated with specific pieces of data or functionality to ensure that they are protected by the policy specified in the ACLs. The security model can allow users and/or applications to define application-specific or custom privileges. These privileges can then be used in ACLs, in addition to system-defined privileges.

An ACL can be used to protect data in the database. Specifically, an ACL can be associated with a table, or with a subset of a table, e.g., a row, a column, or a specific element in the table. ACLs can also be used to perform functional checks from the mid-tier. For example, a mid-tier may use an ACL to determine what information to display to a user.

In one embodiment of the present invention, ACEs are processed in the order in which they are listed, with the ACEs that appear first taking precedence over those that appear later. In one embodiment, the system may process all the ACEs in the ACL, and then select the ACEs that are relevant to the user or role against which the ACL is being processed. The system may then determine privileges that are granted and those that are denied. Next, the system can determine the set of privileges that are required to perform the operation that triggered the privilege check. The system can then check whether the privileges that are required to perform the operation have been granted by the ACL. In one embodiment, if the ACL does not specifically grant or deny a privilege that is required to perform the operation, the privilege is considered to be denied.

In conventional approaches, security policies specified in ACLs are generally independent of the way in which the user authenticates with the system. However, in many situations, there is a need to specify a system-wide security policy for certain privileges based on the user's level of authentication. For example, if the user authenticated using a weak authentication mechanism, e.g., an expired cookie, the user may be granted very limited, almost public-access privileges, irrespective of the privileges that any ACL would have otherwise granted the user. Similarly, it may be desirable to grant highly sensitive privileges only if the user authenticates using a strong authentication mechanism, e.g., a fingerprint scan.

One embodiment of the present invention uses constraining ACL inheritance, which is a way to associate one ACL (called the child ACL) with another (called the parent ACL) in such a way that any check of the child ACL implicitly involves a check of the parent ACL. The user gets only the privileges that are granted by both the parent and child ACLs. Specifically, in one embodiment, a system-wide ACL is defined to specify the security policy that relates to the different levels of authentication. All other ACLs are put into a constraining inheritance relationship with this system-wide ACL as the parent ACL. In this manner, the system is able to ensure that the system-wide security policy is always enforced. Note that this approach for enforcing the system-wide security policy seamlessly meshes with the existing security architecture, and hence, it retains the advantages of the ACL-based security architecture. Specifically, this approach results in a security architecture that is flexible, maintainable, and auditable.

It is important to ensure that the constraining relationship exists whenever an ACL is created or modified in the system. In one embodiment, the system ensures that all ACLs have such a constraining relationship by using an event listener framework. This framework allows applications to hook into various operations in the database and modify or prevent such operations. Specifically, the event listener can be used to ensure that any newly created ACL that does not have a constraining relationship is appropriately modified to add the constraining inheritance relationship. Similarly, whenever an ACL is updated, the event listener can ensure that the constraining inheritance is maintained.

Note that since the constraining ACL may need to be applied to all applications, it may need to be expressed in a manner that is independent of all other ACLs in the system, i.e., the constraining ACL should seamlessly work with the set of application-specific privileges that are used in the system. One embodiment of the present invention achieves this by using a special privilege which encompasses all privileges that are applicable to a particular item of data or functionality. This special privilege can be used to grant or deny all privileges other than the ones mentioned explicitly in the system-wide policy.

An embodiment of the present invention also takes advantage of the fact that the ordering of ACEs within an ACL is significant. As was noted above, ACEs that appear first have higher priority. For example, if the weak authentication level (which can be represented by a dynamic role) needs to be granted only privileges $p_1$, and $p_2$, there would be two grant ACEs for those privileges, one deny ACE to ensure that no other privilege is granted to the weak role, and then a grant ACE to ensure that other than for the weak role, all privileges are granted to all users. The last ACE ensures that the child ACL's policy is followed for all purposes other than that of the weak role. Similarly, to ensure that certain sensitive privileges are granted only to the fingerprint-scan role (a dynamic role representing the fact that the user authenticated himself using a fingerprint scan), an ACE denying those privileges to the inversion of that role (i.e., the denial applies to all users not having that role) is added before the last ACE mentioned above.

Note that an embodiment of the present invention has advantages over other approaches, e.g., approaches that embed the system-wide security policy as exceptions in the system's code. For example, a potentially inferior approach would be to always do one final check irrespective of the ACL to ensure that such exceptions based on the level of authentication are enforced. Such an approach may be inferior because it is not a declarative one and is hence not easily maintainable or auditable. In contrast to such non-declarative approaches, an embodiment of the present invention enables a system to specify its global security policy in a constraining ACL which can then be used in conjunction with other ACLs to determine privileges of a user.

Exemplary ACLs

Figure 2A:
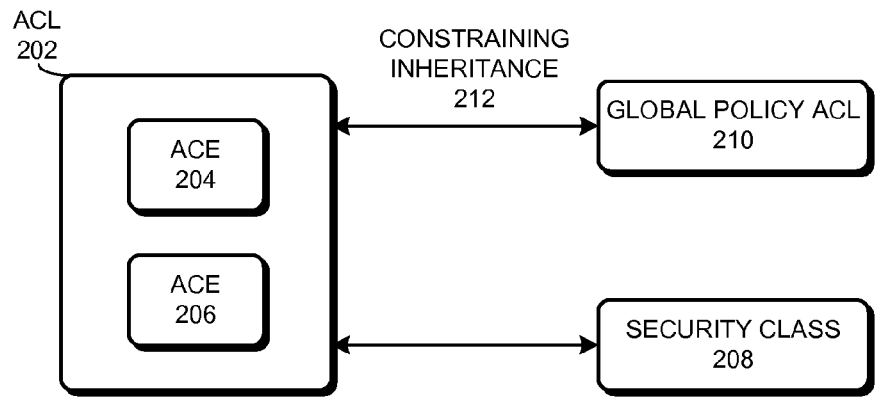
FIG. 2A illustrates an ACL in accordance with an embodiment of the present invention.

FIG. 2A illustrates an ACL in accordance with an embodiment of the present invention.

ACL 202 includes ACEs 204 and 206. ACL 202 can be associated with security class 208 which describes a set of privileges that can be granted or denied by ACL 202. ACL 202 can inherit from global policy ACL 210 which specifies privileges based on a user's authentication level. Note that ACL 202 has a constraining relationship 212 with global policy ACL 210, i.e., whenever the system determines privileges using ACL 202, it automatically causes the system to ensure that global policy 210 also grants those privileges based on the authentication level.

Figure 2B:
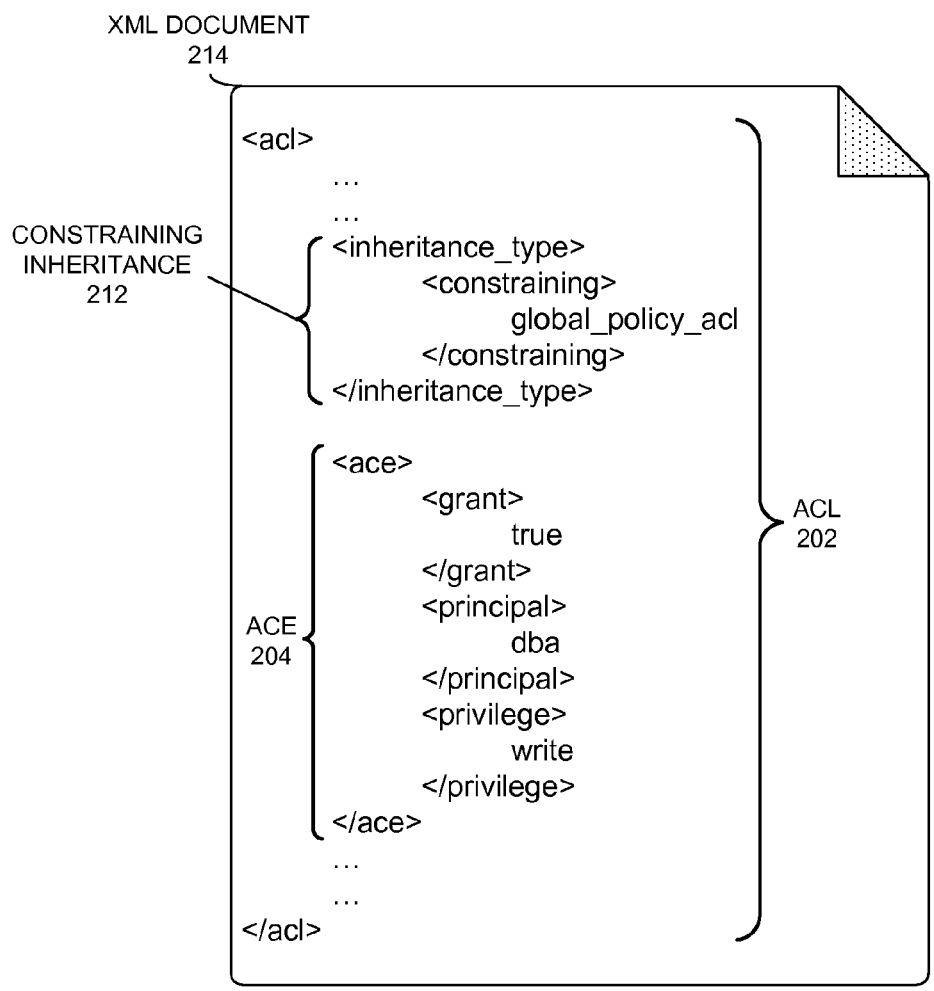
FIG. 2B illustrates how an ACL can be specified using an XML document in accordance with an embodiment of the present invention.

FIG. 2B illustrates how an ACL can be specified using an XML document in accordance with an embodiment of the present invention.

XML document 214 describes ACL 202 and specifies that ACL 202 has a constraining inheritance 212 relationship with global policy ACL 210. ACE 204 shown in FIG. 2B specifies that a user or a role called "dba" has the "write" privilege. For the sake of brevity, FIG. 2B does not show ACE 206. Further, note that FIGS. 2A and 2B have been shown for illustrative purposes only and are not intended to limit the present invention.

Figure 3:
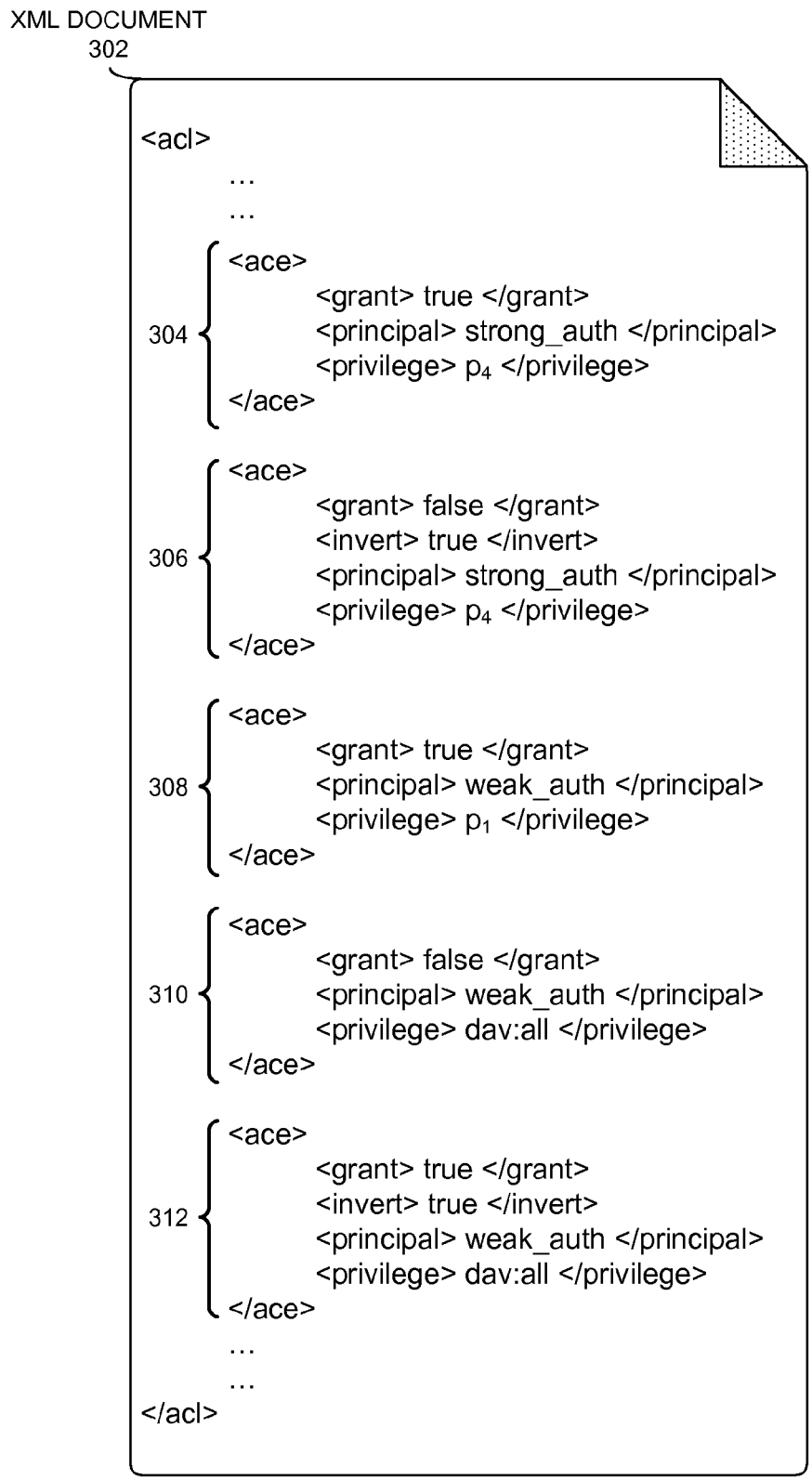
FIG. 3 illustrates how a constraining ACL can be used to support privileges at multiple authentication levels in accordance with an embodiment of the present invention.

FIG. 3 illustrates how a constraining ACL can be used to support privileges at multiple authentication levels in accordance with an embodiment of the present invention.

XML document 302 contains a global policy ACL which includes ACEs 304, 306, 308, 310, and 312, which ensure that: (1) a user who is authenticated using a weak authentication mechanism will at most get privileges $p_1$, and (2) the system will not grant privilege $p_4$ unless the user authenticates using a strong authentication mechanism. When a user authenticates with the system, the user can be associated with an authentication role which reflects the level of authentication of the user. For example, if a user authenticates using a weak authentication mechanism, the user may be associated with a "weak_auth" role, whereas if the user authenticates using a strong authentication mechanism, the user may be associated with a "strong_auth" role.

ACE 304 grants privilege $p_4$ to a user who is associated with a strong authentication role, i.e., to a user who authenticated using a strong authentication mechanism. ACE 306 denies privilege $p_4$ to all users who did not authenticate using a strong authentication mechanism.

ACE 308 grants privilege $p_1$ to a "weak_auth" role, i.e., to a user who authenticated using a weak authentication mechanism. ACE 310 denies all other privileges to the "weak_auth" role. Finally, ACE 312 grants all privileges to authentication roles that are not "weak_auth." However, note that ACE 312 does not grant privilege $p_4$, because this example assumes that the ACE processing semantics are such that the ACEs that appear earlier in the ACL have a higher priority than the ACEs that appear later in the ACL. In other words, ACE 312 does not grant privilege $p_4$ because ACE 306 which denies privilege $p_4$ has a higher priority than ACE 312 which grants all privileges.

Note that ACEs 310 and 312 use a special privilege called "dav:all" which allows an ACE to grant or deny all privileges defined in the associated security class. If the global policy ACL shown in FIG. 3 is associated with a special security class which includes all privileges in the system, the "dav:all" privilege will refer all privileges in the system. Also note that ACE 312 uses the "invert" tag which enables the ACE to select all the users and/or roles except for those specified in the ACE.

ACE 312 plays an important role when the global security ACL interacts with another ACL. To illustrate the purpose of ACE 312, suppose an ACL grants privilege $p_3$ to a user who authenticates at an intermediate authentication level "normal_auth." Further, let us assume that the ACL inherits from the global policy ACL shown in FIG. 3 and that the ACL has a constraining relationship with the global policy ACL 302. Additionally, assume that the ACL processing semantics are such that a user does not have a privilege unless the user is explicitly granted the privilege. Now, if ACE 312 were not present, the system would not have granted privilege $p_3$ to a "normal_auth" user because it is not explicitly granted by the global policy ACL 302. Hence, ACE 312 is important because it enables the system to grant privileges except for those situations in which the privilege has been explicitly denied by ACEs 306 and 310.

Note that an embodiment of the present invention uses a number of security concepts and features in a novel way to determine user privileges based on a user's authentication level. Among other things, the embodiment uses (1) the concept of a constraining inheritance relationship which enables the system to associate a global security policy with all ACLs in the system and which ensures that the global security policy is checked whenever an ACL is checked, (2) the special privilege, e.g., "dav:all," which encompasses all privileges in the associated security class (3) the special security class which includes all privileges in the system, and (4) the mechanism to "invert" a set of users, i.e., to select all users except those specified in the set (e.g., see ACE 312).

The following sections describe exemplary processes for creating an ACL, updating an ACL, and using an ACL.

Process for Creating an ACL

Figure 4:
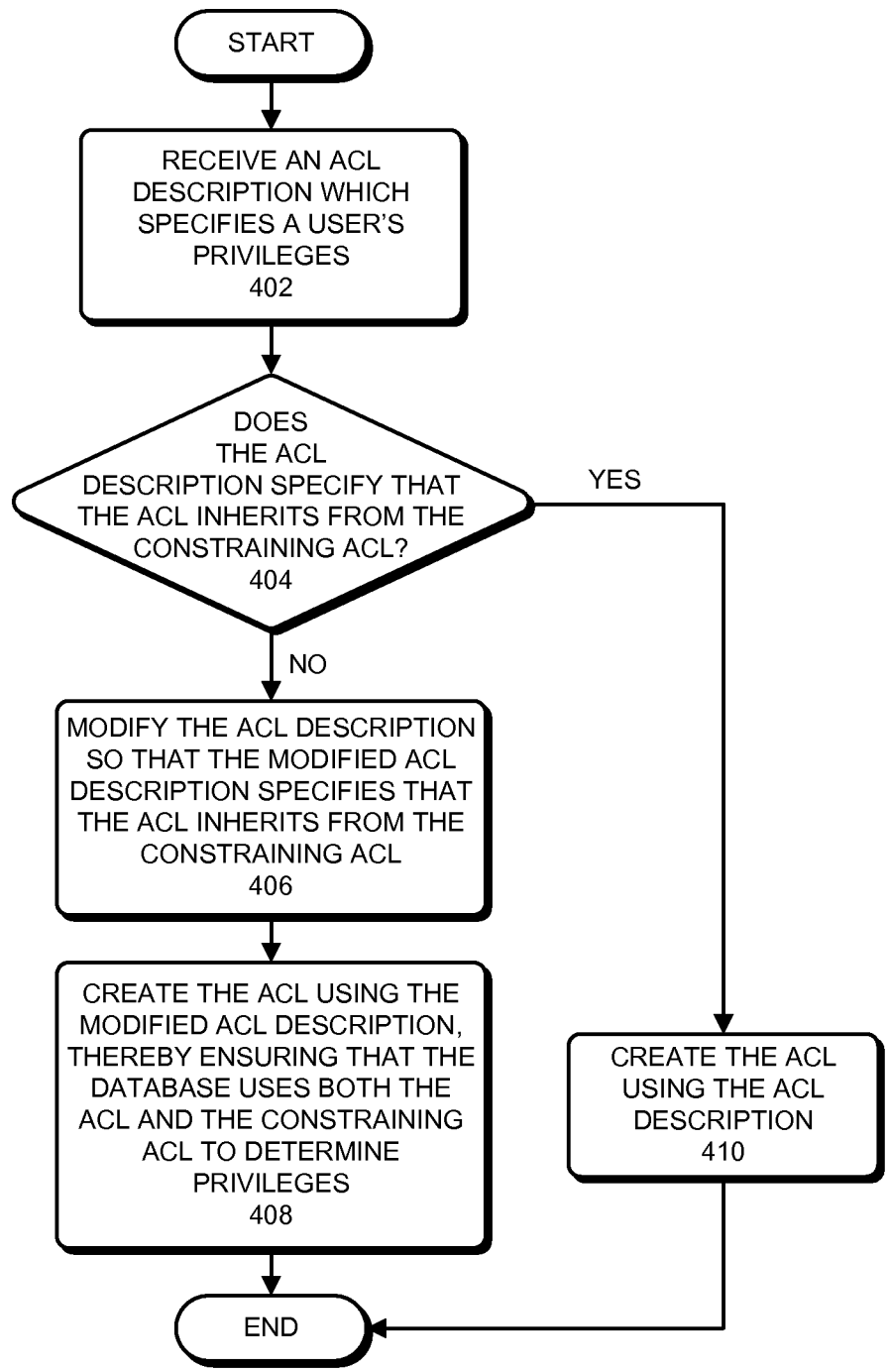
FIG. 4 presents a flowchart that illustrates a process for creating an ACL in a database in accordance with an embodiment of the present invention.

FIG. 4 presents a flowchart that illustrates a process for creating an ACL in a database in accordance with an embodiment of the present invention.

The process can start by receiving an ACL description which specifies a user's privileges (step 402). The ACL description can be encoded in a language that is used for encoding structured data. Specifically, the ACL description can be encoded in a markup language, e.g., XML.

Next, the system may determine whether the ACL description specifies that the ACL inherits from the constraining ACL (step 404). If so, the system may create the ACL using the ACL description (step 410).

On the other hand, if the ACL description does not specify that the ACL inherits from the constraining ACL, the system may modify the ACL description so that the modified ACL description specifies that the ACL inherits from the constraining ACL (step 406).

The system may then create the ACL using the modified ACL description, thereby ensuring that the database uses both the ACL and the constraining ACL to determine privileges (step 408).

Note that the constraining ACL may represent a global security policy which is to be applied to all applications that interact with the database. Hence, ensuring that the database uses both the ACL and the constraining ACL to determine privileges can cause the global security policy to be applied to all applications that interact with the database.

Process for Updating an ACL

Figure 5:
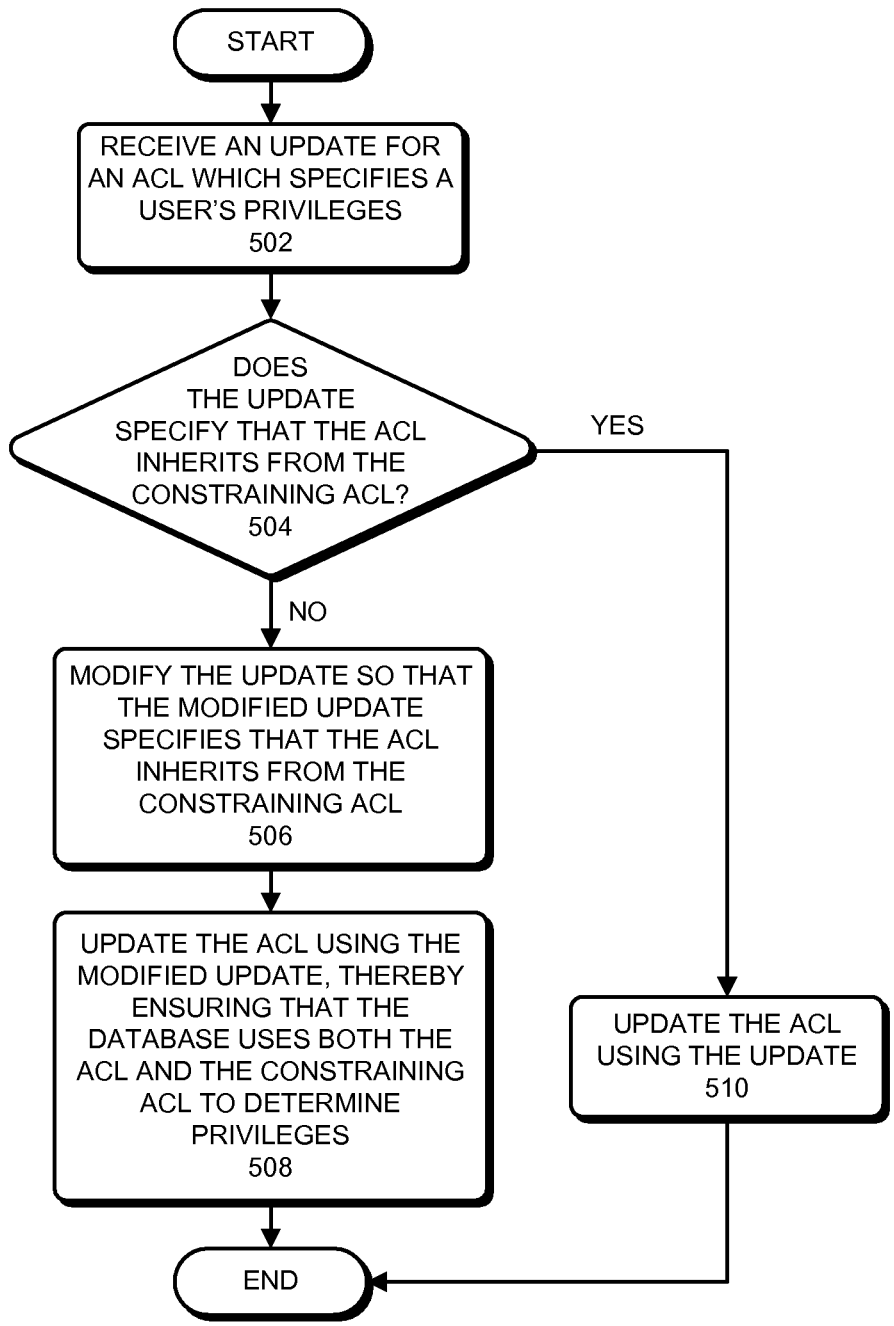
FIG. 5 presents a flowchart that illustrates a process for updating an ACL in a database in accordance with an embodiment of the present invention.

FIG. 5 presents a flowchart that illustrates a process for updating an ACL in a database in accordance with an embodiment of the present invention.

The process may begin by receiving an update for an ACL which specifies a user's privileges (step 502).

Next, the system may determine whether the update specifies that the ACL inherits from the constraining ACL (step 504). If so, the system may update the ACL using the update (step 510).

On the other hand, if the update does not specify that the ACL inherits from the constraining ACL, the system may modify the update so that the modified update specifies that the ACL inherits from the constraining ACL (step 506).

The system may then update the ACL using the modified update, thereby ensuring that the database uses both the ACL and the constraining ACL to determine privileges (step 508).

Process for Using an ACL to Determine User Privileges

Figure 6:
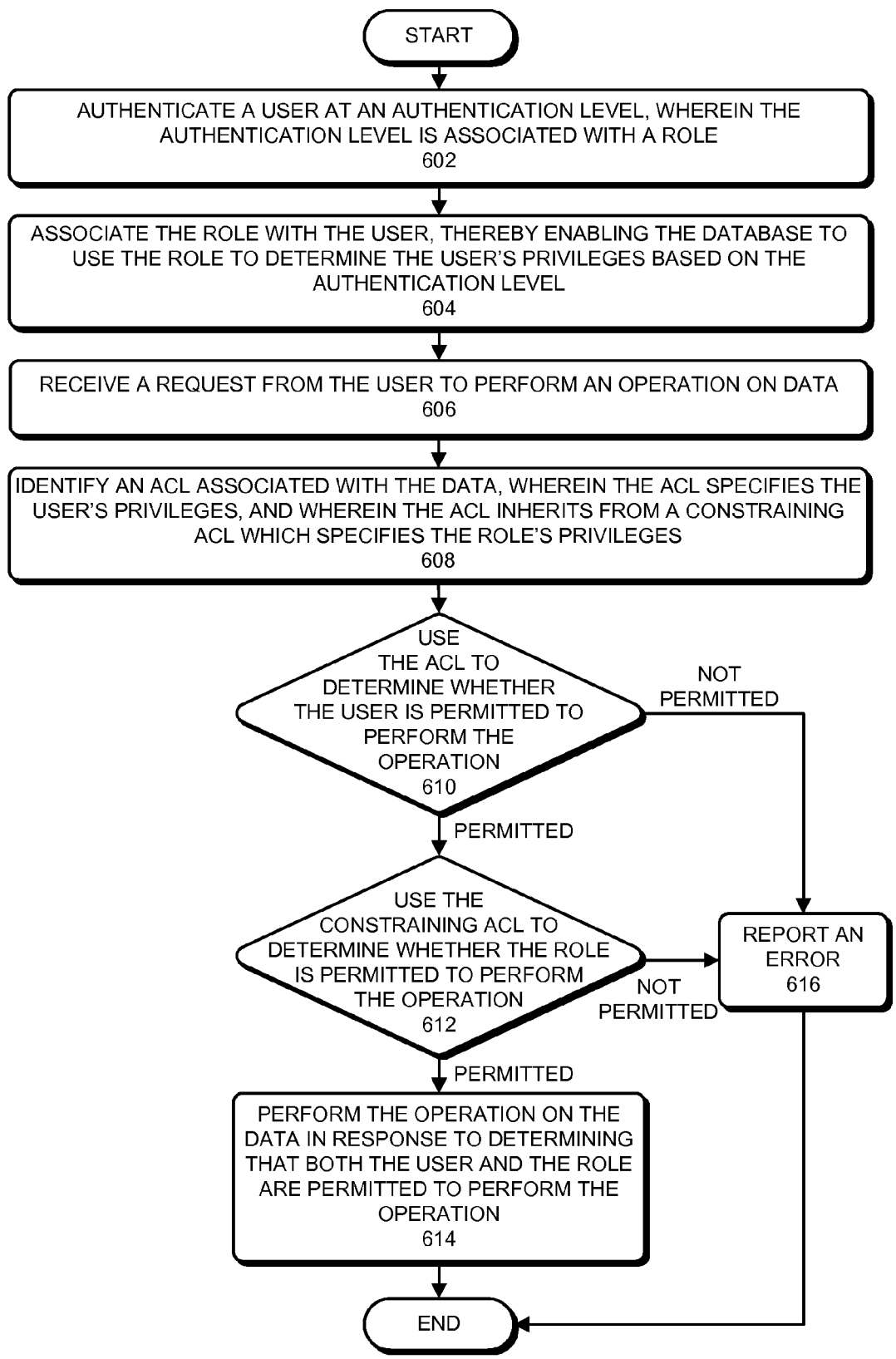
FIG. 6 presents a flowchart that illustrates a process for using an ACL to determine user privileges in a database in accordance with an embodiment of the present invention.

FIG. 6 presents a flowchart that illustrates a process for using an ACL to determine user privileges in a database in accordance with an embodiment of the present invention.

The process can start by authenticating a user at an authentication level, wherein the authentication level is associated with a role (step 602).

Next, the system may associate the role with the user, thereby enabling the database to use the role to determine the user's privileges based on the authentication level (step 604).

The system may receive a request from the user to perform an operation on data (step 606).

Next, the system can identify an ACL associated with the data, wherein the ACL specifies the user's privileges, and wherein the ACL inherits from a constraining ACL which specifies the role's privileges (step 608). In one embodiment, all ACLs except for the constraining ACL inherit from the constraining ACL.

The system may then use the ACL to determine whether the user is permitted to perform the operation (step 610). Next, the system may use the constraining ACL to determine whether the role is permitted to perform the operation (step 612).

The system may then perform the operation on the data in response to determining that both the user and the role are permitted to perform the operation (step 614).

On the other hand, if the user or the role is not permitted to perform the operation, the system may report an error (step 616).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using ACLs (access control lists) to determine user privileges in a database, the method comprising:
   authenticating, by a computer, a user using an authentication method selected from a plurality of authentication methods corresponding to a plurality of authentication levels;
   determining an authentication level of the selected authentication method, wherein the authentication level indicates a security strength of the selected authentication method, and wherein the authentication level corresponds to a user role associated with the user;
   identifying an entry in a constraining ACL based on the determined authentication level, wherein the entry in the constraining ACL specifies a global security policy that is specific to the determined authentication level and applies to all applications interacting with the database;
   receiving a request from the user to perform an operation on data;
   identifying a child ACL, which specifies the user's privileges;
   establishing a constraining inheritance relationship between the child ACL and the constraining ACL, which involves requiring a check of the constraining ACL whenever the child ACL is checked; and
   performing, by the computer, the operation on the data in response to determining that operation is permitted based on the user role, the child ACL and the constraining ACL.

2. The method of claim 1, further comprising reporting an error in response to determining that the operation is not permitted by the child ACL.

3. The method of claim 1, further comprising reporting an error in response to determining that the operation is not permitted by the constraining ACL.

4. The method of claim 1, wherein all ACLs except for the constraining ACL inherit from the constraining ACL.

5. The method of claim 1, wherein the child ACL is encoded in XML (extensible markup language).

6. The method of claim 5, wherein the constraining inheritance relationship is encoded in XML.

7. The method of claim 1, wherein establishing a constraining inheritance relationship involves:
   in response to a description of the child ACL not specifying that the child ACL inherits from the constraining ACL, modifying the description of the child ACL so that the modified description specifies that the child ACL inherits from the constraining ACL; and
   creating the child ACL using the modified description.

8. A non-transitory computer-readable storage medium storing instructions that when executed by a computer cause the computer to perform a method for using ACLs (access control lists) to determine user privileges in a database, the method comprising:
   authenticating a user using an authentication method selected from a plurality of authentication methods corresponding to a plurality of authentication levels;
   determining an authentication level of the selected authentication method, wherein the authentication level indicates a security strength of the selected authentication method, and wherein the authentication level corresponds to a user role associated with the user;
   identifying an entry in a constraining ACL based on the determined authentication level, wherein the entry in the constraining ACL specifies a global security policy that is specific to the determined authentication level and applies to all applications interacting with the database;
   receiving a request from the user to perform an operation on data;
   identifying a child ACL, which specifies the user's privileges;
   establishing a constraining inheritance relationship between the child ACL and the constraining ACL, which involves requiring a check of the constraining ACL whenever the child ACL is checked; and
   performing, by the computer, the operation on the data in response to determining that operation is permitted based on the user role, the child ACL and the constraining ACL.

9. The computer-readable storage medium of claim 8, the method further comprising reporting an error in response to determining that the operation is not permitted by the child ACL.

10. The computer-readable storage medium of claim 8, the method further comprising reporting an error in response to determining that the operation is not permitted by the constraining ACL.

11. The computer-readable storage medium of claim 8, wherein all ACLs except for the constraining ACL inherit from the constraining ACL.

12. The computer-readable storage medium of claim 8, wherein the child ACL is encoded in XML (extensible markup language).

13. The computer-readable storage medium of claim 12, wherein the constraining inheritance relationship is encoded in XML.

14. A computer system that uses ACLs (access control lists) to determine user privileges in a database, the system comprising:
   a processor;
   an authentication mechanism configured to authenticate a user using an authentication method selected from a plurality of authentication methods corresponding to a plurality of authentication levels;
   a determination mechanism configured to determine an authentication level of the selected authentication method, wherein the authentication level indicates a security strength of the selected authentication method, and wherein the authentication level corresponds to a user role associated with the user;
   a first ACL-identifying mechanism configured to identify an entry in a constraining ACL based on the determined authentication level, wherein the entry in the constraining ACL specifies a global security policy that is specific to the determined authentication level and applies to all applications interacting with the database;
   a receiving mechanism configured to receive a request from the user to perform an operation on data;
   a second ACL-identifying mechanism configured to identify a child ACL, which specifies the user's privileges;
   an inheritance mechanism configured to establish a constraining inheritance relationship between the child ACL and the constraining ACL, which involves requiring a check of the constraining ACL whenever the child ACL is checked; and an operation mechanism configured to perform the operation on the data in response to determining that operation is permitted based on the user role, the child ACL and the constraining ACL.

15. The computer system of claim 14, comprising a reporting mechanism configured to report an error in response to determining that the operation is not permitted by the child ACL.

16. The computer system of claim 14, comprising a reporting mechanism configured to report an error in response to determining that the operation is not permitted by the constraining ACL.

17. The computer system of claim 14, wherein all ACLs except for the constraining ACL inherit from the constraining ACL.

18. The computer system of claim 14, wherein the child ACL is encoded in XML (extensible markup language), and wherein the constraining inheritance relationship is encoded in XML.

* * * * *